Jan. 25, 1938.   O. A. BROWN   2,106,235
RELEASING SPEAR
Filed July 30, 1934   2 Sheets-Sheet 1
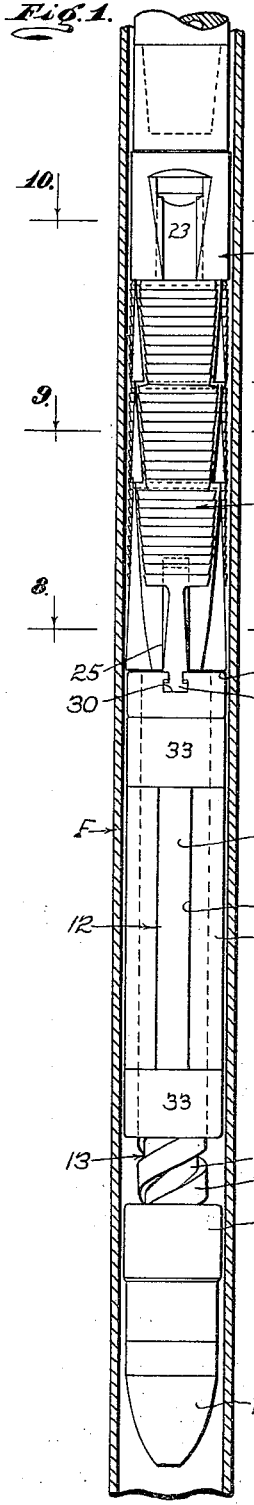
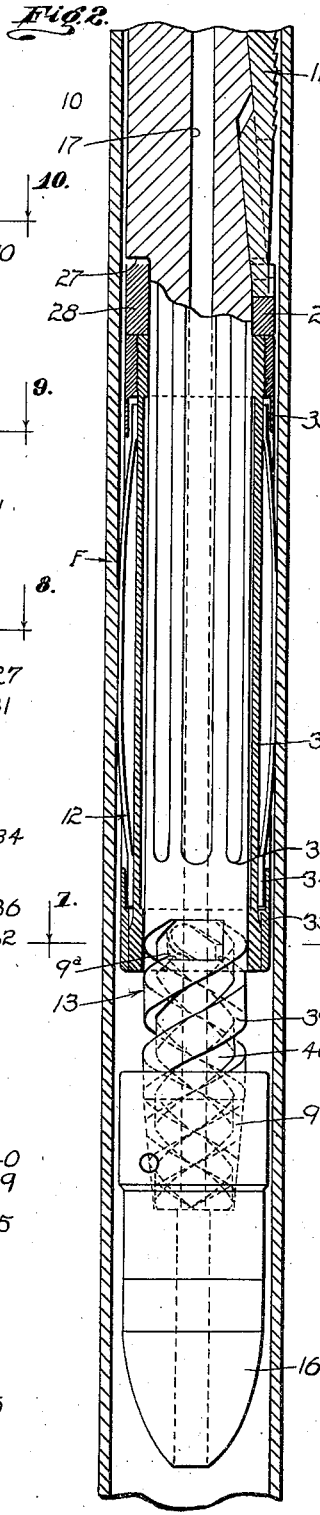
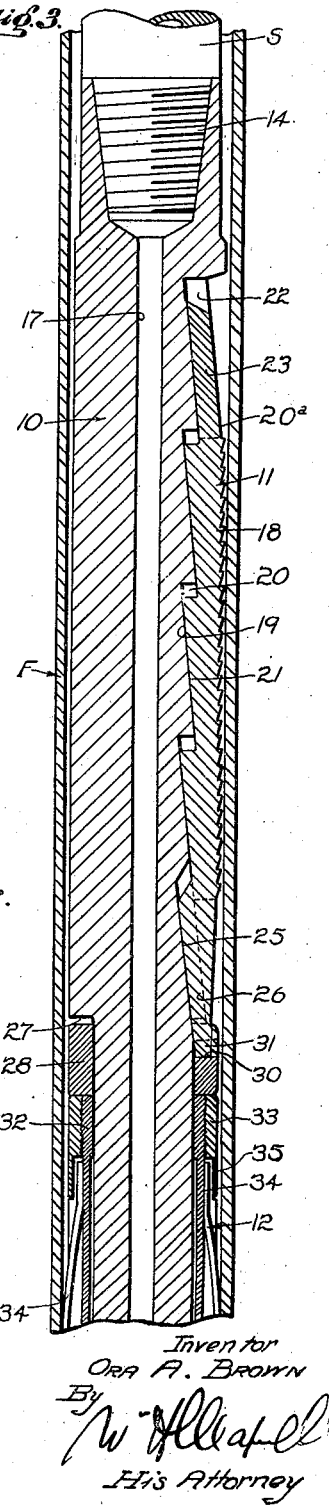
Inventor
ORA A. BROWN
By
His Attorney Jan. 25, 1938.  O. A. BROWN  2,106,235
RELEASING SPEAR
Filed July 30, 1934  2 Sheets-Sheet 2
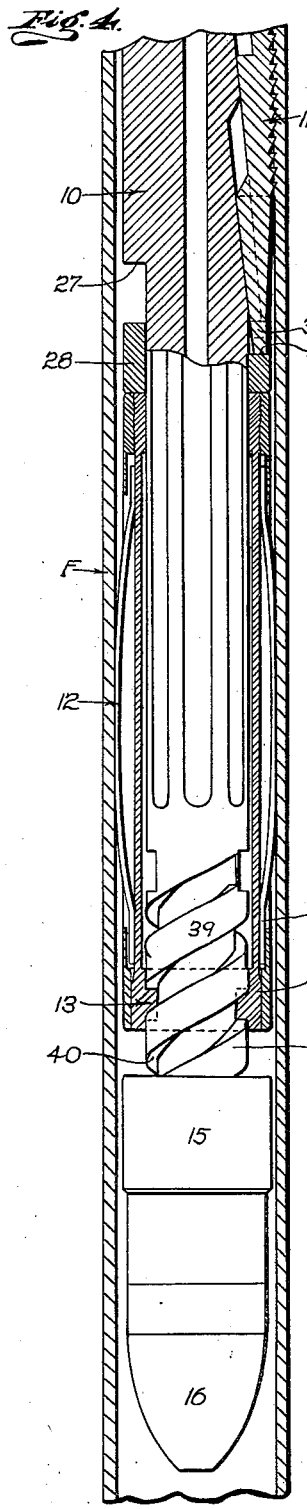
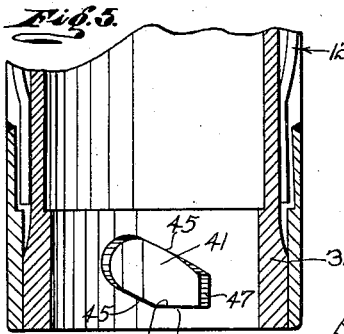
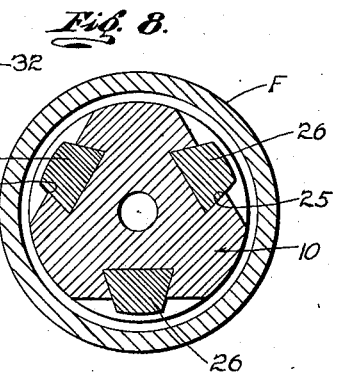
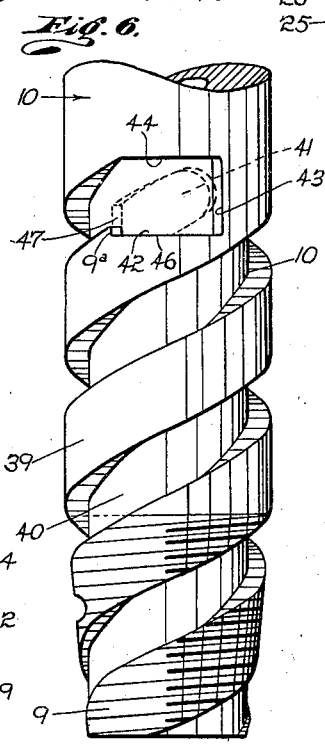
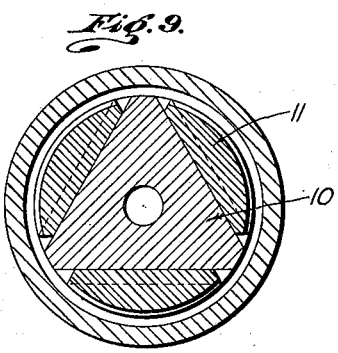
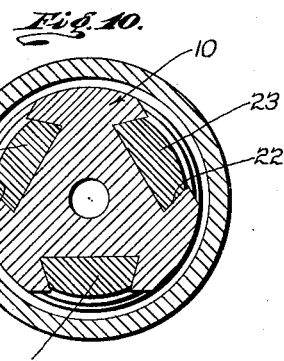
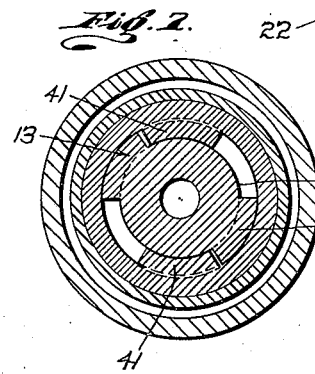
Inventor
ORA A. BROWN
By
W. H. Capwell
His Attorney Patented Jan. 25, 1938

2,106,235

UNITED STATES PATENT OFFICE 2,106,235

RELEASING SPEAR

Ora A. Brown, South Gate, Calif., assignor to Baash-Ross Tool Company, Los Angeles, Calif., a corporation of California Application July 30, 1934, Serial No. 737,592

4 Claims. (Cl. 294—96)

This invention relates to a well tool and relates more particularly to a fishing tool in the form of a spear for recovering tubing, pipe, etc., from wells. A general object of the present invention is to provide a simple, practical and improved spear.

Another object of the invention is to provide a spear in which the gripping members may be easily disengaged or released from the fish if it becomes desirable or necessary to release the spear from the fish.

Another object of the invention is to provide a spear that includes a practical and effective control for the gripping members that holds the gripping members against operation during movement of the tool through the well, and that may be easily operated to release the gripping members for tight positive engagement with the fish.

Another object of the invention is to provide a spear in which the slips or gripping members are interconnected to operate in unison to obtain an effective grip on the fish and to be readily released from the fish if this becomes necessary.

Another object of the invention is to provide a spear of the character mentioned involving a control for the gripping members that allows the gripping members to automatically release from the fish if the fishing string breaks or is allowed to drop.

A further object of the invention is to provide a spear of the character mentioned that is inexpensive of manufacture and that is easy to control and operate.

Other objects and features of the invention will be best and more fully understood from the following detailed description of a typical preferred form and application of the invention, throughout which description reference may be had to the accompanying drawings, in which:

Fig. 1 is a side elevation of the spear provided by this invention showing it in the unactuated position within a fish. Fig. 2 is an enlarged longitudinal detailed sectional view of the lower portion of the spear showing the parts in the unactuated positions. Fig. 3 is an enlarged longitudinal detailed sectional view of the upper portion of the spear with the parts in the unactuated positions. Fig. 4 is a view similar to Fig. 2 showing the parts in the actuated positions. Fig. 5 is an enlarged fragmentary sectional view of the lower portion of the sleeve illustrating one of the thread parts. Fig. 6 is an enlarged side elevation of the lower threaded portion of the body apart from the other elements of the tool. Fig. 7 is an enlarged transverse detailed sectional view taken on line 7—7 on Fig. 2. Figs. 8, 9 and 10 are enlarged, transverse detailed sectional views taken as indicated by lines 8—8, 9—9 and 10—10, respectively, on Fig. 1.

The spear provided by the present invention includes, generally, a mandrel or body 10, gripping slips or members 11 carried by the body 10 and operable into engagement with the interior of a fish F, and a control for the gripping members 11 comprising a tail piece 12 normally co-operating with the assembly of gripping members, and a connection 13 between the tail piece 12 and the body 10 for controlling the operation of the tail piece and gripping members.

The mandrel or body 10 is adapted to be operated on the lower end of a fishing string S and carries the various parts of the tool. Suitable means is provided on the upper end of the body 10 to facilitate its connection with the string S. In the particular case illustrated in the drawings a tapered screw-threaded socket 14 is provided in the upper end of the body to receive a threaded pin on the lower end of the string S. A threaded portion or pin 9 is provided on the lower end of the body 10 to receive or carry a connecting member 15. A bull nose or guide member 16 is provided on the connecting member 15. The guide member 16 has a tapering and rounded lower end to effectively guide the spear through the well bore and into the fish F. A central longitudinal fluid passage 17 extends through the body 10 from one end to the other to discharge at the lower end of the guide member 16.

The gripping members 11 are normally retained in their contracted position on the body 10 by the control and upon the release of the control are adapted to engage and grip the interior of the fish F. In the preferred structure there is a plurality of gripping members 11. In the particular embodiment of the invention illustrated in the drawings there are three like slips or gripping members 11. The gripping members 11 are arranged on the upper portion of the body 10 and are of substantial length to have extensive engagement with the fish. The outer sides of the gripping members 11 are rounded or convexed to conform, generally, to the interior of the fish F and are provided with gripping teeth 18. Longitudinal series of inclined faces 19 are provided on the inner sides of the gripping members 11. The inclined faces 19 are preferably flat and are inclined downwardly and outwardly with respect to the central longitudinal axis of the tool. The inclined faces or wedge faces 19 are stepped having their lower ends terminating in upwardly facing shoulders 20. The body 10 is provided with three longitudinal series of inclined faces 21 for cooperating with the faces 19 of the gripping members. The body faces 21 have the same inclination and length as the faces 19. The body faces 21 cooperate with the faces 19 to actuate the gripping members directly radially outwardly and to effectively support the gripping members when in engagement with the fish.

Means is provided for maintaining the gripping members 11 in their proper positions in cooperation with the body faces 21. This means includes dove-tailed longitudinal grooves 22 extending upwardly from the upper ends of the series of faces 21. Tails or keys 23 are provided on the upper ends of the members 11 to slidably operate in the grooves 22. The keys 23 are dovetailed to cooperate with the grooves 22 and prevent outward displacement of the upper ends of the members 11. The slip retaining or positioning means includes dove-tailed grooves 25 extending downwardly from the lower ends of the series of faces 21. Keys or tails 26 extend downwardly from the lower ends of the gripping members 11 to slidably fit the grooves 25. The tails 26 are provided with divergent sides to slidably engage the correspondingly divergent side walls of the grooves 25. The inner walls of the grooves 22 and 25 and the inner sides of the keys 23 and tails 26 have the same pitch or inclination as the faces 19 and 21. The cooperation of the keys 23 with the grooves 22 and the cooperation of the tails 26 with the grooves 25 holds the gripping members 11 in their proper positions and allows the proper relative movement between the body 10 and slips during the actuation and contraction of the gripping members.

In accordance with the invention the slips or gripping members 11 are interconnected to operate in unison. A downwardly facing shoulder 27 is provided on the exterior of the body 10 at the lower ends of the grooves 25. The portion of the body below the shoulder 27 is preferably cylindrical in its general configuration. A ring 28 is arranged on this portion of the body for longitudinal movement and is provided with substantially T-shaped openings 30. The openings 30 extend into the ring 28 from its upper end and receive extensions or keys 31 on the lower ends of the tails 26. The keys 31 are substantially T-shaped to fit the openings 30 and cooperate with the openings to connect the gripping members 11 with the ring 28. The keys 31 are movable radially in the openings 30 during the actuation and contraction of the gripping members. The ring 28 forms an effective connection between the several gripping members 11 insuring the simultaneous actuation of the members.

The control embodied in the spear is an important feature of the invention and is operatable to cause or permit actuation of the gripping members 11 and the release of the gripping members 11 upon simple, definite manipulation of the string S. The control includes the tail piece 12 for cooperating with the gripping member assembly and the operative connection 13 between the tail piece 12 and the body 10.

The tail piece 12 is arranged on the mandrel or body 10 between the ring 28 and the member 15. The tail piece 12 comprises a tubular body or sleeve 32 surrounding the body 10 and a plurality of springs 34 on the sleeve for frictionally engaging the interior of the fish F. The sleeve 32 is freely movable longitudinally and circumferentially on the body 10 and is preferably internally recessed between its ends to have greater freedom of movement. The portion of the body 10 surrounded by the sleeve 32 may be provided with longitudinal grooves 37 to facilitate the lubrication of the tail piece and to prevent the accumulation of sand and solid matter between the moving parts. Collars 33 are provided on the upper and lower ends of the tail piece sleeve 32. The upper collar 33 is preferably threaded or detachably connected with the sleeve while the lower collar 33 may be welded to the sleeve as illustrated in the drawings. Annular flanges 35 are provided on the collars 33 to surround reduced portions of the sleeve 32. The springs 34 are in the form of leaf springs and are bowed outwardly to engage the interior of the fish F to yieldingly resist movement of the tail piece relative to the fish. Longitudinal slots or grooves 36 are provided in the sleeve 32 to receive the springs 34. The springs 34 are bowed outwardly from these grooves 36 to bear against the interior of the fish F. The opposite end portions of the springs 34 are received under the flanges 35 and the flanges operate to prevent displacement of the springs. The upper end of the tail piece sleeve 32 cooperates with the lower end of the ring 28 and through this engagement cooperates with and governs the gripping members 11.

The connection 13 between the tail piece 12 and the body 10 operates to initially or normally hold the tail piece in a position where the gripping members 11 are contracted to allow the free movement of the tool through the well and is operatable by rotation of the string S and body 10 to cause or allow actuation of the gripping members.

The operative connection 13 may be termed a threaded connection and comprises a double thread 39 on the body 10 formed by a pair of helical grooves 40 and two fragments or portions 41 of a thread on the sleeve 32 for cooperating with the thread 39. The thread grooves 40 are provided in the lower portion of the body 10. To simplify the manufacture of the tool the grooves 40 may extend upwardly in the body from the lower end portion of the pin 9. In the preferred construction the grooves 40 are of substantial depth and are uniform in configuration and size. It is a feature of the invention that the slots or grooves 40 terminate at their upper ends in horizontally extending enlarged portions each having a flat lower wall or surface 42. The surfaces 42 lie in a plane normal to the longitudinal axis of the body 10. The end walls 43 of the enlarged upper portions of the grooves 40 may be vertical while the upper walls 44 may be parallel with the surfaces 42. Detent projections 9$^a$ may be provided at the point of joinder of the surfaces 42 with the helical walls of the grooves 40.

The thread portions 41 are in the form of projections or lugs on the interior of the tail piece sleeve 32. The lugs or thread portions 41 are provided adjacent the lower end of the sleeve 32 and are shaped and proportioned to readily slidably operate through the grooves 40. The sides 45 of the thread portions 41 are pitched or spiralled to cooperate with the correspondingly spiralled walls of the grooves 40. The invention provides flat faces 46 on the lower sides of the thread portions 41 to cooperate with the surfaces 42. The lower ends 47 of the thread portions 41 may be flat and substantially vertical to cooperate with the detent projections 9$^a$. When the parts of the tool are in their normal or unactuated positions the thread portions 41 are in the upper ends of the grooves 40 and the faces 46 are in engagement with the surfaces 42. This engagement and the cooperation of the faces 47 with the projections 9a prevents relative movement between the tail piece 12 and the body 10 and thus prevents actuation of the gripping members 11. Fig. 6 of the drawings illustrates one of the thread portions 41 in broken lines in the upper end portion of a groove 40.

The tool or spear is run into the well on the lower end of the string S with its parts in the positions illustrated in Figs. 1, 2 and 3 of the drawings. The cooperation between the flat horizontal surfaces 42 and 46 and the engagement of the faces 47 with the projections 9a prevents movement of the tail piece with respect to the body and retains the tail piece in what may be termed its up position where it holds the gripping members 11 in their retracted positions. The guide members 16 guides the tool through the well and into the fish F and the springs 34 frictionally bear against the wall of the fish when the spear is passed into the fish. To actuate the gripping members 11 after the tool has reached a suitable position in the fish, the string S is turned or rotated in a direction to disengage the surfaces 42 and projections 9a from the thread portions 41. The projections 9a are slightly rounded and permit the required movement between the body and tail piece when the body is deliberately rotated. The springs 34 of the tail piece frictionally cooperate with the interior of the fish F to resist movement of the tail piece so that the body may be turned with respect to the tail piece to disengage the surfaces 42 from the thread portions 41 as just described. Following the disengagement of the surfaces 42 from the thread portions 41 the fishing string S is raised or pulled upwardly causing the spiralled walls of the grooves 40 to cooperate with the thread portions 41. This cooperation causes the tail piece 12 to be fed or moved downwardly with respect to the body. The resistance to movement of the tail piece offered by the springs 34 insures the proper downward feeding of the tail piece relative to the body when the body 10 is raised. Downward movement of the tail piece 12 with respect to the body 10 releases the gripping members 11 for operation or expansion. The string S may be pulled upwardly with the desired force to effectively actuate the gripping members 11 outwardly into gripping engagement with the fish F. The body faces 21 cooperate with the faces 19 to actuate the gripping members 11 outwardly when the upstrain is put on the string S. After the gripping members 11 have obtained a good hold on the fish F the string S may be pulled upwardly to dislodge the fish and withdraw the fish from the well. If the fish cannot be loosened and recovered in this manner it may become necessary to disengage the spear from the fish. To release the spear from the fish F the fishing string S is allowed to lower or settle and may be or is rotated causing the spiralled walls of the grooves 40 to cooperate with the sides 45 of the thread portions 41 to feed or move the tail piece 12 upwardly on the body. Thus lowering and rotating of the string S and body 10 moves the tail piece 12 upwardly on the body to release or disengage the gripping members 11 from the fish. When the upper portions of the thread grooves 40 receive the thread portions 41 the string S may be given a partial rotation to cause the thread portions to enter the horizontal parts of the grooves, whereupon the surfaces 42 cooperate with the faces 46. The engagement or cooperation of these flat horizontal faces retains the tail piece 12 in its up position where the gripping members 11 are retracted so that the spear may be pulled upwardly and withdrawn from the well without danger of unintentional actuation of the gripping members.

The spear provided by the present invention is particularly dependable and effective in operation and is easy to control and operate. The spear 10 may be readily released from the fish if necessary, and its gripping parts remain in their retracted position during movement of the spear through the well. The operative connection 13 is such that the gripping members 11 are automatically released or freed for release in the event that the string S breaks or is allowed to suddenly drop. When the string S breaks or is allowed to drop its downward movement causes the walls of the grooves 40 to cooperate with the sides 45 of the thread portions to feed or move the tail piece 12 upwardly on the body. Upward movement of the tail piece on the body 10 releases the gripping members from the fish F. This is particularly desirable as it provides for the easy recovery of the fishing tool in the event of breakage of the fishing string.

Having described only a typical preferred form and application of my invention, I do not wish to be limited or restricted to the specific form and application herein set forth, but wish to reserve to myself any modifications or variations that may appear to those skilled in the art or fall within the scope of the following claims.

Having described my invention, I claim:

1. A well tool including a body adapted to enter a tubular fish, a gripping member on the exterior of the body adapted to be actuated outwardly to grip a fish, and a control for the gripping member comprising an assembly movable on the body adapted to have movement resisting engagement with the fish and related to the gripping element to hold it in a retracted position, and an operative connection between the assembly and body for feeding the assembly relative to the body to a position where the gripping member is released for actuation, the body having a spiralled thread groove of at least 180° extent, said connection comprising a lug on the assembly cooperating with the groove, the groove having a straight portion for retaining the lug in a position where the gripping member is retracted.

2. A well tool including a body having an inclined face, a gripping member on the body operable outwardly by said face to grip a fish, and a control for the gripping member comprising an assembly movable on the body adapted to have movement resisting engagement with the fish and related to the gripping element to hold it in a retracted position, and an operative connection between the assembly and body for feeding the assembly to a position where the gripping member is released for actuation, the body having a spiralled groove with a straight portion, the connection including a lug on the assembly adapted to operate in the groove and adapted to be retained in said straight portion, and a detent projection in the groove for releasably holding the lug in said straight portion of the groove.

3. A fishing tool including a body adapted to enter a tubular fish, the body having an inclined surface and a spiralled groove, a gripping member on the exterior of the body operatable outwardly through cooperation with said surface, a movable sleeve on the body having cooperation with the gripping member, means for releasably holding the sleeve in a position where the gripping member is inactive, including a flat surface on the wall of said groove, and a part on the sleeve operable in the groove to effect feeding of the sleeve and adapted to be held against movement through cooperation with the last mentioned surface.

4. A well tool including a body, a gripping member on the body adapted to be actuated outwardly to grip a fish, and a control for the gripping member comprising an assembly movable on the body adapted to have movement resisting engagement with the fish and related to the gripping element to hold it in a retracted position, and an operative connection between the assembly and body for feeding the assembly to a position where the gripping member is released for actuation, the body having a spiralled groove, the said connection including a flat surface on the wall of the groove, a lug on the assembly adapted to move through the groove, and a flat face on the lug adapted to cooperate with said surface to resist movement of the lug in the groove.

ORA A. BROWN.